United States Patent
Jones et al.

(10) Patent No.: US 11,386,478 B1
(45) Date of Patent: Jul. 12, 2022

(54) COMPUTERIZED SYSTEMS AND METHODS FOR USING ARTIFICIAL INTELLIGENCE TO GENERATE PRODUCT RECOMMENDATIONS

(71) Applicant: Coupang Corp., Seoul (KR)

(72) Inventors: Thomas Berry Jones, Seattle, WA (US); Emily Xiaoyun Hua, Mountain View, CA (US); Nishant Agrawal, Sunnyvale, CA (US)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 17/150,339

(22) Filed: Jan. 15, 2021

(51) Int. Cl.
*G06Q 30/00* (2012.01)
*G06Q 30/06* (2012.01)
*G06N 20/00* (2019.01)
*G06F 16/245* (2019.01)
*G06F 9/451* (2018.01)

(52) U.S. Cl.
CPC ......... *G06Q 30/0631* (2013.01); *G06F 9/451* (2018.02); *G06F 16/245* (2019.01); *G06N 20/00* (2019.01); *G06Q 30/0625* (2013.01); *G06Q 30/0633* (2013.01); *G06Q 30/0641* (2013.01)

(58) Field of Classification Search
CPC ........... G06Q 30/0631; G06Q 30/0633; G06Q 30/0625; G06Q 30/0641; G06N 20/00; G06F 16/245; G06F 9/451
See application file for complete search history.

(56) References Cited

U.S. PATENT DOCUMENTS

| 8,301,764 B2 | 10/2012 | Konig et al. |
| 2010/0076857 A1* | 3/2010 | Deo ............ H04L 67/306 705/26.1 |
| 2010/0293494 A1* | 11/2010 | Schmidt ............ G06Q 30/0631 715/772 |
| 2014/0100986 A1* | 4/2014 | Linden ............... G06Q 30/0256 705/26.7 |

(Continued)

FOREIGN PATENT DOCUMENTS

| KR | 10-0961782 | 6/2010 |
| KR | 10-2013-0035660 | 4/2013 |

OTHER PUBLICATIONS

S. Sivapalan, A. Sadeghian, H. Rahnama and A. M. Madni, "Recommender systems in e-commerce," 2014 World Automation Congress (WAC), 2014, pp. 179-184, doi: 10.1109/WAC.2014.6935763. (Year: 2014).*

(Continued)

*Primary Examiner* — Anand Loharikar
(74) *Attorney, Agent, or Firm* — Finnegan, Henderson, Farabow, Garrett & Dunner LLP

(57) ABSTRACT

Systems and method are provided for AI-based product recommendation generation. One method includes, predicting, using a model, a plurality of recommended products, by determining a time span associated with a user identifier; retrieving at least one query submitted by a user associated with the user identifier during the time span; extracting attributes; determining a product category based on the extracted attributes; generating a list of products based on the determined product category; generating a list of recommended products based on the generated list of products; and modifying a user interface element associated with a webpage to include the generated list of recommended products.

19 Claims, 8 Drawing Sheets

(56) References Cited

U.S. PATENT DOCUMENTS

2015/0339759 A1 11/2015 Pope et al.
2018/0276731 A1 9/2018 Patel et al.

OTHER PUBLICATIONS

International Search Report and Written Opinion dated Oct. 13, 2021 in counterpart PCT International Application No. PCT/IB2021/050876, 8 pages.

* cited by examiner

US 11,386,478 B1

COMPUTERIZED SYSTEMS AND METHODS FOR USING ARTIFICIAL INTELLIGENCE TO GENERATE PRODUCT RECOMMENDATIONS

TECHNICAL FIELD

The present disclosure generally relates to computerized systems and methods for using artificial intelligence (AI) to generate product recommendations. In particular, embodiments of the present disclosure relate to inventive and unconventional systems that may automatically modify a user interface element based on a user identifier and a product identifier associated with a query by generating a model to generate a list of recommended products.

BACKGROUND

Consumers often shop for and purchase various items online through computers and smart devices. These online shoppers often require more than one day to determine the best product for them to purchase. For example, many online shoppers may spend weeks researching and evaluating multiple products before purchasing the best product. However, the normal online shopping experience is hindered by online shopping engines that treat all customer sessions the same, regardless of how long a shopper has been deliberating products. For example, conventional online shopping engines may provide similar recommendations regardless of whether the shopper has been shopping for a product for one day or for fourteen days.

Millions of products are registered online by sellers every day. Sellers are required to select the correct category to which their product belongs when registering their products online for sale. However, many sellers do not select the correct category when registering their product. For example, a seller may incorrectly select the "Kid's Fashion" category when registering an infant onesie that belongs in the "Baby" category. Incorrect product categorization may severely reduce a consumer's user experience by prolonging the consumer's product search and by reducing the recommendation quality of the online platform. Furthermore, manually correcting the categorization of products is often difficult and time-consuming since tens of thousands of different categories may exist. A consumer's user experience would be significantly improved if the online platform automatically categorized products into their correct categories.

Online shopping engines that fail to account for a shopper's actions during a customer session for a product may severely reduce a shopper's user experience by prolonging the shopper's product search and by reducing the recommendation quality of the online platform. Furthermore, manually accounting for different customer sessions is difficult and time-consuming since many different shoppers with various customer sessions exist. A consumer's user experience would be significantly improved if the online platform automatically learned from consumers' shopping behavior and customized product recommendations accordingly.

Therefore, there is a need for improved methods and systems for generating product recommendations so that consumers may quickly find and purchase products while online shopping.

SUMMARY

One aspect of the present disclosure is directed to a system for AI-based product recommendation generation. The system may include a memory storing instructions and at least one processor configured to execute instructions. The instructions may include receiving, from a user device, a query; extracting at least one keyword from the query; based on the extracted keywords, determining a user identifier and a product identifier; and based on the determined user identifier and the determined product identifier, searching a database associated with the user identifier and the product identifier. The instructions may further include, based on the user identifier and the product identifier, predicting, using the model, a plurality of recommended products, by determining a time span associated with the user identifier; retrieving at least one query submitted by a user associated with the user identifier during the time span; retrieving at least one filter application submitted by the user during the time span; retrieving at least one product specification associated with at least one product associated with the retrieved queries or filter applications; extracting attributes from the retrieved query, the retrieved filter application, and the retrieved product specification; determining a product category based on the extracted attributes; generating a list of products based on the determined product category; generating a list of recommended products based on the generated list of products; and modifying a user interface element associated with a webpage to include the generated list of recommended products.

Another aspect of the present disclosure is directed to a method for AI-based product recommendation generation. The method may include receiving, from a user device, a query; extracting at least one keyword from the query; based on the extracted keywords, determining a user identifier and a product identifier; and based on the determined user identifier and the determined product identifier, searching a database associated with the user identifier and the product identifier. The instructions may further include, based on the user identifier and the product identifier, predicting, using the model, a plurality of recommended products, by determining a time span associated with the user identifier; retrieving at least one query submitted by a user associated with the user identifier during the time span; retrieving at least one filter application submitted by the user during the time span; retrieving at least one product specification associated with at least one product associated with the retrieved queries or filter applications; extracting attributes from the retrieved query, the retrieved filter application, and the retrieved product specification; determining a product category based on the extracted attributes; generating a list of products based on the determined product category; generating a list of recommended products based on the generated list of products; and modifying a user interface element associated with a webpage to include the generated list of recommended products.

Yet another aspect of the present disclosure is directed to a system for AI-based product recommendation generation. The system may include a memory storing instructions and at least one processor configured to execute instructions. The instructions may include receiving, from a user device, a query; extracting at least one keyword from the query; based on the extracted keywords, determining a user identifier and a product identifier; and based on the determined user identifier and the determined product identifier, searching a database associated with the user identifier and the product identifier. The instructions may further include, based on the user identifier and the product identifier, predicting, using the model, a plurality of recommended products, by determining a time span associated with the user identifier; retrieving at least one query submitted by a user associated with the user identifier during the time span; retrieving at least one filter application submitted by the user during the time span; retrieving at least one product specification associated with at least one product associated with the retrieved queries or filter applications; extracting attributes from the retrieved query, the retrieved filter application, and the retrieved product specification; determining a product category based on the extracted attributes; generating a list of products based on the determined product category; generating a list of recommended products based on the generated list of products; calculating a similarity score for each product on the generated list; removing products with similarity scores below a threshold from the generated list; and modifying a user interface element associated with a webpage to include the generated list of recommended products.

Other systems, methods, and computer-readable media are also discussed herein.

DETAILED DESCRIPTION

Figure 1A:
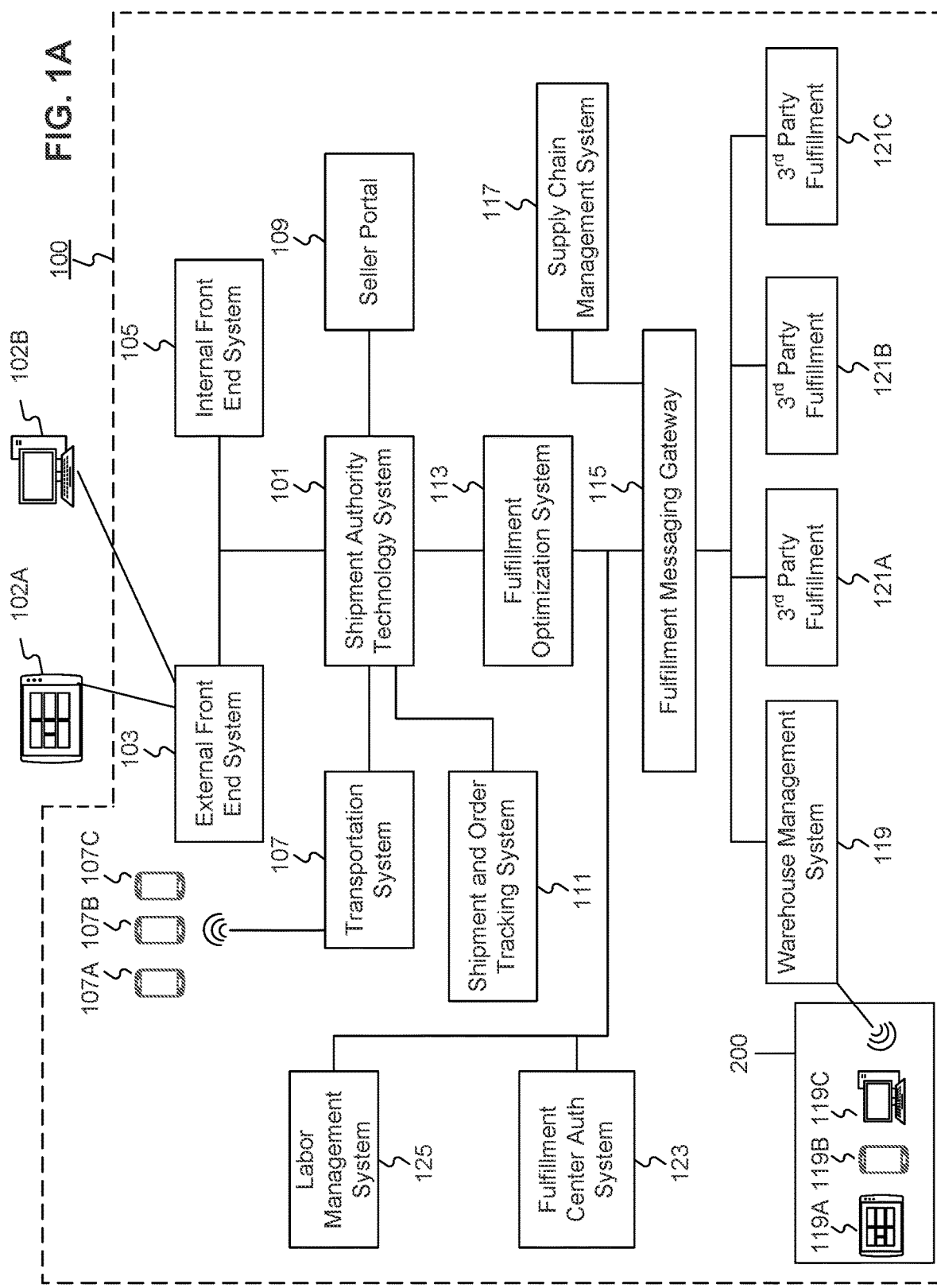
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Detail Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for AI-based product recommendation generation. The disclosed embodiments are capable of using a model to predict at least one recommended product based on the user identifier and the product identifier. For example, a product recommendation system may retrieve at least one query submitted by a user associated with a user identifier during a time span. The product recommendation system may use the model and attributes extracted from queries to determine a product category associated with the user identifier and a product identifier.

In some embodiments, the product recommendation system may generate a list of recommended products by calculating a similarity score for each product on a generated list of products. In some embodiments, the product recommendation system may calculate the similarity scores by assigning at least one weighted value to at least one factor. In some embodiments, the at least one factor may include historical user data of at least one of selecting a product on a webpage, adding a product to a cart on the webpage, or purchasing a product on the webpage.

In some embodiments, a user may interact with a user interface element associated with a webpage to sort the generated list of recommended products. For example, the product recommendation system may modify a user interface element so that the user may sort the generated list of recommended products by price, similarity score, sales volume, etc. In some embodiments, the product recommendation system may automatically modify the user interface element to display the generated list of recommended products by price, similarity score, sales volume, etc.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
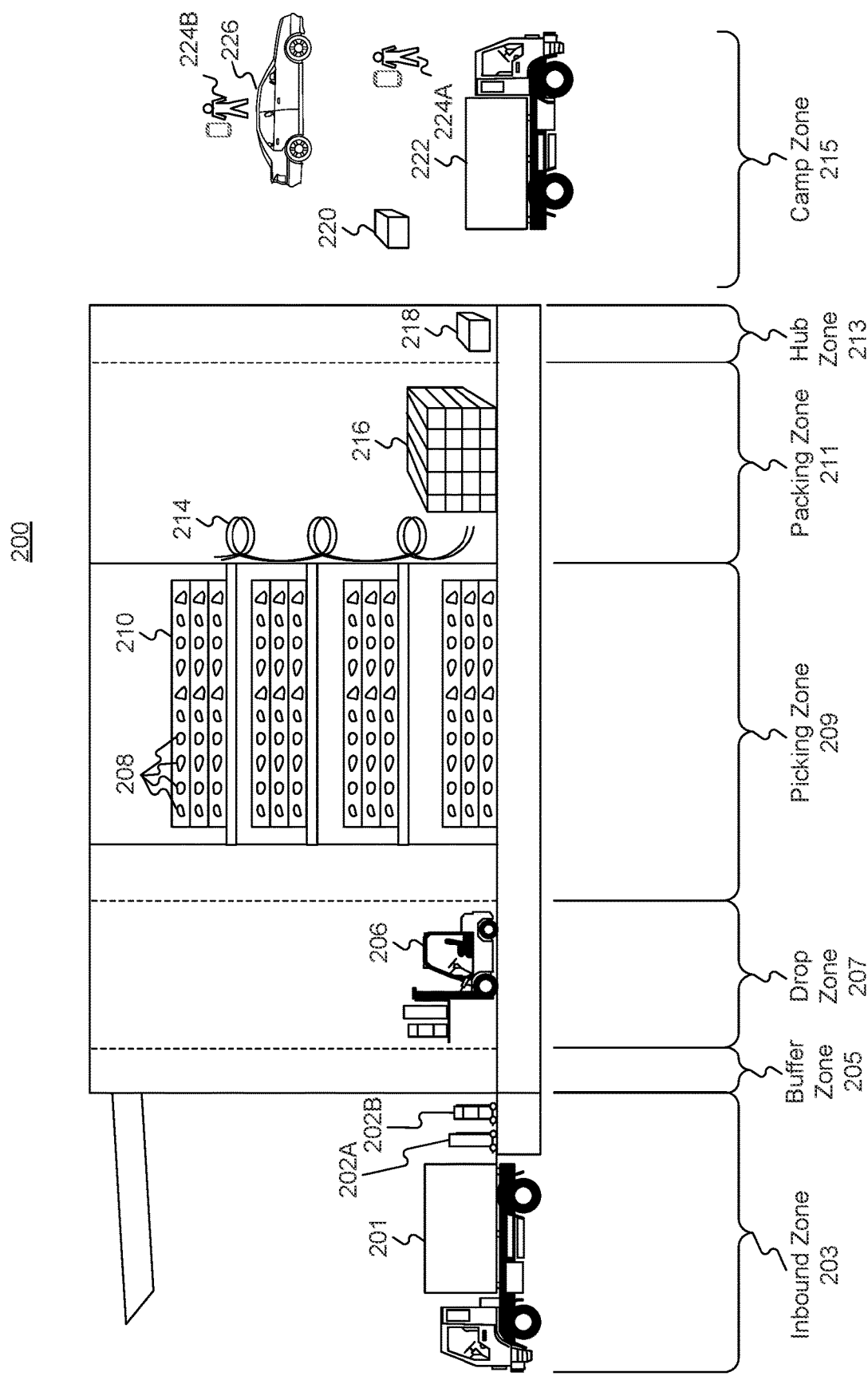
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
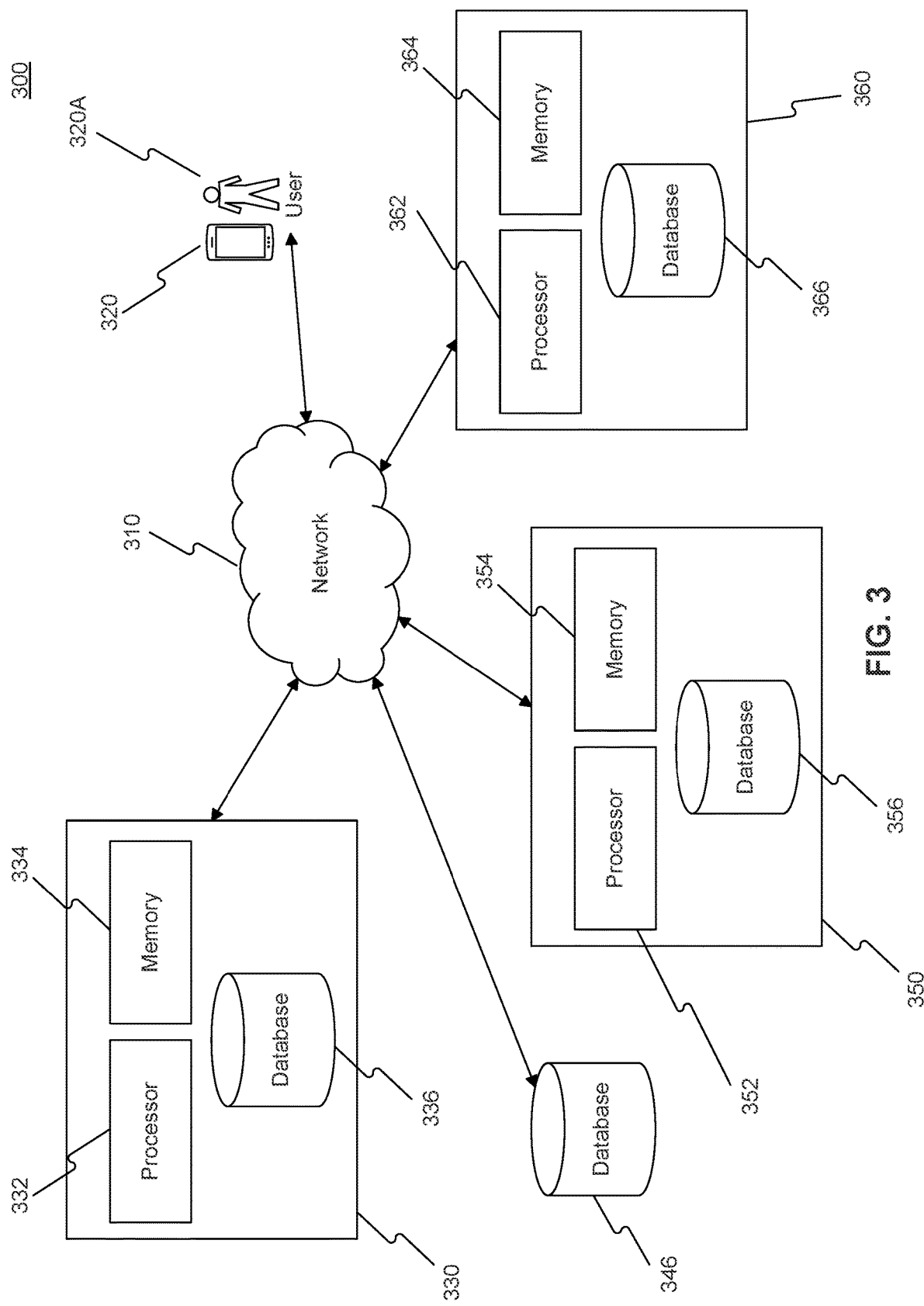
FIG. 3 depicts an exemplary network of devices and systems for AI-based product recommendation generation, consistent with the disclosed embodiments.

Referring to FIG. 3, an exemplary network of devices and systems for AI-based product recommendation generation is shown. As illustrated in FIG. 3, a system 300 may include a product recommendation system 330, a query system 350, and a customer affinity system 360. Product recommendation system 330, query system 350, and customer affinity system 360 may communicate with a user device 320 associated with a user 320A or search action logs 346 via a network 310. In some embodiments, product recommendation system 330, query system 350, and customer affinity system 360 may communicate with the other components of system 300 via a direct connection, for example, using a cable. In some other embodiments, system 300 may be a part of system 100 of FIG. 1A and may communicate with the other components of system 100 via network 310 or via a direct connection, for example, using a cable. Product recommendation system 330, query system 350, and customer affinity system 360 may each comprise a single computer or may each be configured as a distributed computer system including multiple computers that interoperate to perform one or more of the processes and functionalities associated with the disclosed examples.

As shown in FIG. 3, product recommendation system 330, query system 350, and customer affinity system 360 may each comprise processor 332, 352, and 362, respectively. Processors 332, 352, or 362 may be one or more known processing devices, such as a microprocessor from the Pentium™ family manufactured by Intel™ or the Turion™ family manufactured by AMD™. Processors 332, 352, or 362 may constitute a single core or multiple core processor that executes parallel processes simultaneously. For example, processors 332, 352, or 362 may use logical processors to simultaneously execute and control multiple processes. Processors 332, 352, or 362 may implement virtual machine technologies or other known technologies to provide the ability to execute, control, run, manipulate, store, etc. multiple software processes, applications, programs, etc. In another example, processors 332, 352, or 362 may include a multiple-core processor arrangement configured to provide parallel processing functionalities to allow product recommendation system 330, query system 350, or customer affinity system 360 to execute multiple processes simultaneously. One of ordinary skill in the art would understand that other types of processor arrangements could be implemented that provide for the capabilities disclosed herein.

Product recommendation system 330, query system 350, and customer affinity system 360 may each comprise memory 334, 354, and 364, respectively. Memories 334, 354, or 364 may store one or more operating systems that perform known operating system functions when executed by processors 332, 352, or 362. By way of example, the operating system may include Microsoft Windows, Unix, Linux, Android, Mac OS, iOS, or other types of operating systems. Accordingly, examples of the disclosed invention may operate and function with computer systems running any type of operating system. Memories 334, 354, or 364 may be a volatile or non-volatile, magnetic, semiconductor, tape, optical, removable, non-removable, or other type of storage device or tangible computer readable medium.

Product recommendation system 330, query system 350, and customer affinity system 360 may each comprise databases 336, 356, or 366. Databases 336, 356, or 366 may include, for example, Oracle™ databases, Sybase™ databases, or other relational databases or non-relational databases, such as Hadoop™ sequence files, HBase™, or Cassandra™. Databases 336, 356, or 366 may include computing components (e.g., database management system, database server, etc.) configured to receive and process requests for data stored in memory devices of the database(s) and to provide data from the database(s). Databases 336, 356, or 366 may include NoSQL databases such as HBase, MongoDB™ or Cassandra™. Alternatively, databases 336, 356, or 366 may include relational databases such as Oracle, MySQL and Microsoft SQL Server. In some embodiments, database 336 may take the form of servers, general purpose computers, mainframe computers, or any combination of these components.

Databases 336, 356, or 366 may store data that may be used by processors 332, 352, or 362, respectively, for performing methods and processes associated with disclosed examples. Databases 336, 356, or 366 may be located in product recommendation system 330, query system 350, and customer affinity system 360, respectively, as shown in FIG. 3, or alternatively, it may be in external storage devices located outside of product recommendation system 330, query system 350, and customer affinity system 360. Data stored in database 336 may include product categories, similarity scores, generated lists of products, generated lists of recommended products, thresholds, product price, aggregated customer actions, search trends, historical data. Data stored in database 356 may include queries submitted by users, keywords included in queries, keywords associated with a product identifier, historical data, etc. Data stored in database 366 may include filter applications submitted by users (e.g., product dimensions, product brands, product price minimum, product price maximum, product price range, historical data, etc.) or product specifications, such as product dimensions, product brands, product colors, product storage capacity, associated keywords or products, etc.

User device 320 may be a tablet, mobile device, computer, or the like. User device 320 may include a display. The display may include, for example, liquid crystal displays (LCD), light emitting diode screens (LED), organic light emitting diode screens (OLED), a touch screen, and other known display devices. The display may show various information to a user. For example, it may display a user interface element (e.g., on a webpage associated with SRP of FIG. 1B), which may include a filter application for a list of products, options for submitting a query, options for selecting a product, options for adding a product to a cart, options for purchasing a product, options to sort a generated list of recommended products by price, similarity score, or sales volume, buttons for the listed examples, etc.

User device 320 may include one or more input/output (I/O) devices. The I/O devices may include one or more devices that allow user device 320 to send and receive information from user 320A or another device. The I/O devices may include various input/output devices, a camera, a microphone, a keyboard, a mouse-type device, a gesture sensor, an action sensor, a physical button, an oratory input, etc. The I/O devices may also include one or more communication modules (not shown) for sending and receiving information from product recommendation system 330, query system 350, or customer affinity system 360 by, for example, establishing wired or wireless connectivity between user device 320 and network 310.

In some embodiments, user 320A may be an internal user (e.g., employees of an organization that owns, operates, or leases systems 100 or 300) or an external user (e.g., an online shopper).

In some embodiments, system 300 may receive, from user device 320, a query (e.g., a search request). External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. System 300 may extract at least one keyword from the query. System 300 may determine a user identifier (e.g., a customer identification, user identification, computer identification, name, address, e-mail address, phone number, etc.) and a product identifier (e.g., product type keywords associated with at least one product category, a barcode, an image, a text string, an RFID tag, or the like) based on the extracted keywords. The user identifier may be associated with user 320A (e.g., an online shopper).

System 300 may search a database 346 containing search action logs associated with the user identifier and the product identifier. Database 346 may include historical user actions associated with various users (e.g., products users searched, products users purchased, queries users submitted, etc.) or historical data associated with a plurality of product identifier customers may interact with on a webpage (e.g., while browsing a webpage, selecting a product on a webpage, adding a product to a cart on a webpage, purchasing a product on a webpage). Although database 346 is depicted as separate from databases 336, 356, and 366, in some embodiments, database 346 may be integrated with one or more of databases 336, 356, and 366.

In some embodiments, product recommendation system 330 may use a model to predict at least one recommended product based on the user identifier and the product identifier. For example, product recommendation system 330 may determine a time span associated with the user identifier by calculating a time in which user 320A may perform a predetermined number of actions. For example, the predetermined number of actions may be determined based on historical data associated with a plurality of product identifier customers may interact with on a webpage (e.g., while browsing a webpage, selecting a product on a webpage, adding a product to a cart on a webpage, purchasing a product on a webpage). For example, the predetermined number of actions may be an average number of actions customers may perform starting from first searching for a product to purchasing a product. In some embodiments, the time span may be associated with an average amount of time in which a customer may browse for and purchase a product. In some embodiments, the actions may include at least one of selecting a product on a webpage, adding a product to a cart on the webpage, or purchasing a product on the webpage.

Product recommendation system 330 may retrieve at least one query submitted by a user associated with the user identifier during the time span from query system 350. In some embodiments, the queries may include at least one keyword associated with a product identifier. In some embodiments, product recommendation system 330 may retrieve at least one filter application submitted by user 320A during the time span from customer affinity system 360. The filter applications may include at least one of product dimensions, product brand, product price. In some embodiments, a user interface associated with a webpage may include a filter application, where user 320A may use the filter application on a list of products on a webpage (e.g., a list of products provided when the user submits a query). In some embodiments, product recommendation system 330 may retrieve at least one product specification associated with at least one product associated with the retrieved queries or filter applications. In some embodiments, the product specifications may include at least one of product dimensions, product brands, product colors, or product storage capacity.

In some embodiments, query system 350 may extract attributes from queries submitted by users. For example, query system 350 may extract keywords from queries. In some embodiments, customer affinity system 360 may extract attributes from filter applications applied by users and attributes from product specification. For example, customer affinity system may extract filter applications (e.g., product dimensions, product brands, product price minimum, product price maximum, product price range, etc.) and associated keywords or products. In some embodiments, customer affinity system may extract product specifications associated with keywords or products with which users have interacted (e.g., selecting a product on a webpage, adding a product to a cart on the webpage, purchasing a product on the webpage, etc.).

In some embodiments, product recommendation system 330 may extract attributes from historical data over moving windows of time to train and generate a model. In some embodiments, product recommendation system 330 may use the model and the extracted attributes from the queries, the filter applications, and the product specifications to determine a product category associated with the user identifier and the product identifier. In some embodiments, the training data may include at least one of historical queries, historical filter applications, or historical product specifications of a plurality of customers.

For example, attributes from historical data of queries may include laptops, Samsung Laptops, 15-inch Samsung Laptops, 15-inch Gaming laptops, etc. In some embodiments, product recommendation system 330 may use the extracted attributes to determine at least one product category (e.g., laptops) associated with the queries. In some embodiments, attributes from historical data of filter applications may include a 15-inch size filter, a 'Samsung' brand filter, a less than $300 price filter, etc. Product recommendation system 330 may use the extracted attributes to determine that at least one product category associated with the filter applications includes laptops. In some embodiments, attributes from historical data of product specifications may include a 15-inch size associated with Samsung or Sony laptops customers have selected during a time span (e.g., two weeks). Product recommendation system 330 may use the extracted attributes to determine that at least one product category associated with the product specifications includes high-end laptops.

In some embodiments, product recommendation system 330 may generate a list of products based on the determined product category. For example, product recommendation system 330 may generate a list including all products with which user 320A (associated with the user identifier) engaged (e.g., products the user selected on a webpage, added to a cart on the webpage, or purchased on the webpage). In some embodiments, product recommendation system 330 may retrieve data from at least one of database 346 (the search action logs), query system 350, or customer affinity system 360 to generate the list. In some embodiments, the list of products may be generated based on user actions performed during the time span. For example, product recommendation system 330 may generate a list of products with which user 320 engaged in the past two weeks.

In some embodiments, product recommendation system 330 may calculate a similarity score for each product on the generated list. In some embodiments, product recommendation system 330 may calculate the similarity score based on a comparison of attributes of products on the generated list to the determined product category. In some embodiments, products with more attributes in common with attributes of the determined product category may have a higher similarity score. In some embodiments, product recommendation system 330 may remove products with similarity scores below a threshold from the generated list of products. In some embodiments, similarity scores may be calculated using any combination of methods described below.

In some embodiments, the threshold may be determined by an internal user. In some embodiments, product recommendation system 330 may determine the threshold based on historical data for all customers. In some embodiments, when all of the products on the generated list have similarity scores below the threshold, a new threshold may be determined (e.g., a default threshold). In some embodiments, all the products may remain on the generated list. In some embodiments, no recommended products may be provided. For example, product recommendation system 330 may calculate a threshold based on a deviation in historical values (e.g., product price, product categories, aggregated customer actions, etc.). For example, product recommendation system 330 may not calculate similarity scores for products with attributes that deviate more than a predetermined value from historical averages of attributes for those products. In some embodiments, product recommendation system 330 may end the running model when no products have a similarity score that meets the threshold.

In some embodiments, product recommendation system 330 may generate a list of recommended products by calculating a similarity score (e.g., a numerical value) for each product on the generated list of products. In some embodiments, product recommendation system 330 may calculate the similarity scores by assigning at least one weighted value to at least one factor. In some embodiments, the at least one factor may include historical user data of at least one of selecting a product on a webpage, adding a product to a cart on the webpage, or purchasing a product on the webpage. For example, each user engagement with a product may be a factor with a value of "1" (e.g., adding a product to a cart on a webpage five times may have a sum of factors of "5"). Product recommendation system 330 may assign a weighted value to a factor by multiplying a weighted value by the value of the factor. For example, selecting a product on a webpage may be assigned a weighted value of "1," adding a product to a cart on a webpage may be assigned a weighted value of "3," and purchasing a product on a webpage may be assigned a weighted value of "10" (e.g., so that products that were adding to a cart have higher similarity scores than products that were selected on a webpage).

For example, in some embodiments, attributes of products used to calculate similarity scores may include at least one of product price, product category, or aggregated customer actions. For example, product recommendation system 330 may calculate similarity scores based on a comparison of product prices on the generated list of products to the product price of the product identifier associated with the determined product category. In some embodiments, a threshold may include a price minimum, maximum, or range and product recommendation system 330 may remove products with similarity scores that do not meet the threshold from the generated list of products.

In some embodiments, product recommendation system 330 may determine search trends (e.g., user is searching for a discounted product, user is searching for specific brand of product, user is searching for a size range of a product, etc.) based on the extracted attributes and assign weighted values to factors in calculating the similarity score based on the search trends. For example, product recommendation system 330 may assign a higher weighted value to product price factors for products that have prices within a determined price range (e.g., the price range may be the average price within a predetermined deviation for products with which the user interacted). For example, each product price may be a factor with a value of "1." Product recommendation system 330 may assign a weighted value to a factor by multiplying a weighted value by the value of the factor. For example, engagement with a product that has a product price outside a determined price range may be assigned a weighted value of "1" while engagement with a product that has a product price within a determined price range may be assigned a weighted value of "10."

In some embodiments, product recommendation system 330 may calculate similarity scores based on a comparison of product categories on the generated list to the determined product category. In some embodiments, product recommendation system 330 may remove products with similarity scores that indicate that the products do not belong to the determined product category from the generated list of products. For example, user 320A may frequently or primarily engage with expensive laptops (e.g., Macbooks, Microsoft Surface, etc.) within a two week time span, but also occasionally engage with significantly less expensive laptops (e.g., searching for laptops that are less than $200). Product recommendation system 330 may determine that the product category is expensive laptops and may calculate similarity scores that indicate that the significantly less expensive laptops do not belong to the determined category. Product recommendation system 330 may remove the significantly less expensive laptops from the generated list of products so that only relevant products are recommended to user 320A.

In some embodiments, product recommendation system 330 may calculate similarity scores based on a comparison of aggregated customer actions. For example, aggregated customer actions may include all customer actions (e.g., selecting a product on a webpage, adding a product to a cart on the webpage, purchasing a product on the webpage, etc.) for products belonging to the determined product category in the same time span or a different time span. In some embodiments, product recommendation system 330 may calculate similarity scores based on customer actions in a time span that ends at the point in time when the product belonging to the determined product category was purchased by a customer (e.g., user 320A).

In some embodiments, product recommendation system 330 may calculate similarity scores by assigning different weights to different customer actions. For example, purchasing a product on a webpage may be assigned a higher weight than adding a product to a cart on a webpage and adding a product to a cart on a webpage may be assigned a higher weight than selecting a product on a webpage. For example, each user engagement with a product may be a factor with a value of "1" (e.g., adding a product to a cart on a webpage five times may have a sum of factors of "5"). Product recommendation system 330 may assign a weighted value to a factor by multiplying a weighted value by the value of the factor. For example, selecting a product on a webpage may be assigned a weighted value of "1," adding a product to a cart on a webpage may be assigned a weighted value of "3," and purchasing a product on a webpage may be assigned a weighted value of "10" (e.g., so that products that were adding to a cart have higher similarity scores than products that were selected on a webpage).

In some embodiments, products with similarity scores based on aggregated customer actions may not be initially included in the generated list of products. For example, product recommendation system 330 may calculate similarity scores based on a comparison of aggregated customer actions after generating the list of products. In some embodiments, product recommendation system 330 may add a predetermined number of products with the highest similarity scores to the generated list of products. In some embodiments, an internal user may determine the number of products to be added to the generated list. In some embodiments, the number of products to be added to the generated list may be determined based on historical data for all customers. For example, historical data may indicate that the predetermined number of products results in a list of products with the lowest amount of deviation in similarity scores.

In some embodiments, product recommendation system 330 may determine a plurality of product identifier based on the extracted keywords and determine that the plurality of product identifier belong to the same product category or related product categories. In some embodiments, product recommendation system 330 may determine a plurality of product categories for one or more product identifier. In some embodiments, product recommendation system 330 may perform steps, as described above, to generate a list of products for each determined product category.

In some embodiments, product recommendation system 330 may add greater weight to a product when the product appears on more than one generated list, resulting in a higher similarity score for that product. For example, if three lists are generated and product A appears on two lists while product B appears on three lists, product B is assigned a higher similarity score than product A, thereby advantageously resulting in a more accurate generated list for product recommendations.

In some embodiments, user 320A may interact with a user interface element associated with a webpage (e.g., SRP of FIG. 1B) to sort the generated list of recommended products. For example, product recommendation system 330 may modify a user interface element so that user 320A may sort the generated list of recommended products by price, similarity score, sales volume, etc. In some embodiments, product recommendation system 330 may automatically modify the user interface element to display the generated list of recommended products by price, similarity score, sales volume, etc.

Figure 4:
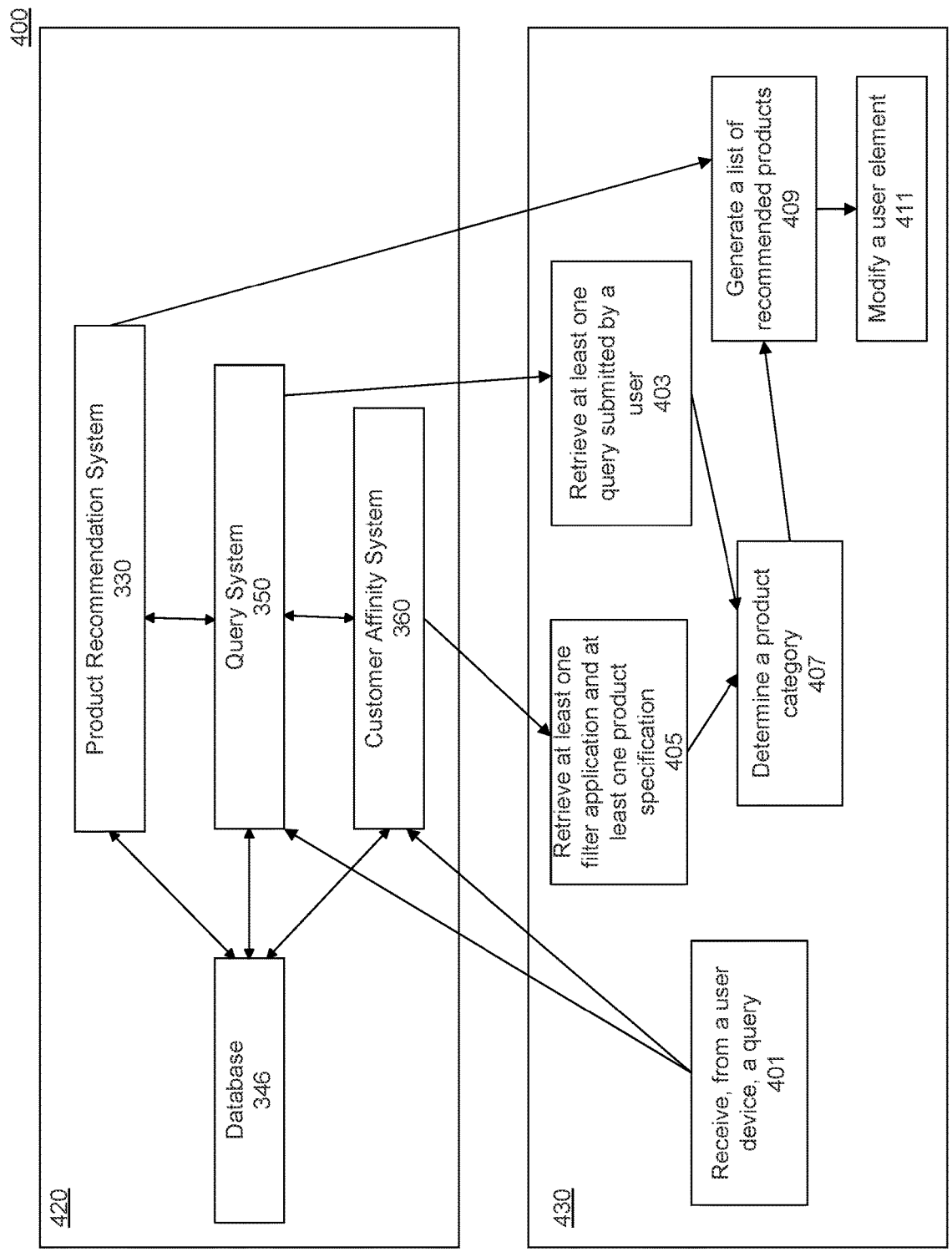
FIG. 4 depicts an exemplary process for AI-based product recommendation generation, consistent with the disclosed embodiments.

Referring to FIG. 4, a process 400 for AI-based product recommendation generation is shown. While in some embodiments product recommendation system 330 may perform several of the steps described herein, other implementations are possible. For example, any of the systems and components (e.g., system 100, query system 350, customer affinity system 360, etc.) described and illustrated herein may perform the steps described in this disclosure. In some embodiments, the system components in setting 420 may operate in an offline environment while the steps in setting 430 may be performed in a real-time, online environment.

In step 401, system 300 may receive, from user device 320, a query (e.g., a search request). System 300 may extract at least one keyword from the query. System 300 may determine a user identifier (e.g., a customer identification, user identification, computer identification, name, address, e-mail address, phone number, etc.) and a product identifier (e.g., product type keywords associated with at least one product category, a barcode, an image, a text string, an RFID tag, or the like) based on the extracted keywords. The user identifier may be associated with user 320A (e.g., an online shopper).

System 300 may search a database 346 containing search action logs associated with the user identifier and the product identifier. In some embodiments, product recommendation system 330 may use a model to predict at least one recommended product based on the user identifier and the product identifier. For example, product recommendation system 330 may determine a time span associated with the user identifier by calculating a time in which user 320A may perform a predetermined number of actions. For example, the predetermined number of actions may be determined based on historical data associated with a plurality of product identifier customers may interact with on a webpage (e.g., while browsing a webpage, selecting a product on a webpage, adding a product to a cart on a webpage, purchasing a product on a webpage). For example, the predetermined number of actions may be an average number of actions customers may perform starting from first searching for a product to purchasing a product. In some embodiments, the time span may be associated with an average amount of time in which a customer may browse for and purchase a product. In some embodiments, the actions may include at least one of selecting a product on a webpage, adding a product to a cart on the webpage, or purchasing a product on the webpage.

In step 403, product recommendation system 330 may retrieve at least one query submitted by a user associated with the user identifier during the time span from query system 350. In some embodiments, the queries may include at least one keyword associated with a product identifier. In some embodiments, query system 350 may extract attributes from queries submitted by users. For example, query system 350 may extract keywords from queries.

In step 405, product recommendation system 330 may retrieve at least one filter application submitted by user 320A during the time span from customer affinity system 360. The filter applications may include at least one of product dimensions, product brand, product price. In some embodiments, a user interface associated with a webpage may include a filter application, where user 320A may use the filter application on a list of products on a webpage (e.g., a list of products provided when the user submits a query). In some embodiments, product recommendation system 330 may retrieve at least one product specification associated with at least one product associated with the retrieved queries or filter applications. In some embodiments, the product specifications may include at least one of product dimensions, product brands, product colors, or product storage capacity. In some embodiments, customer affinity system 360 may extract attributes from filter applications applied by users and attributes from product specification. For example, customer affinity system may extract filter applications (e.g., product dimensions, product brands, product price minimum, product price maximum, product price range, etc.) and associated keywords or products. In some embodiments, customer affinity system may extract product specifications associated with keywords or products with which users have interacted (e.g., selecting a product on a webpage, adding a product to a cart on the webpage, purchasing a product on the webpage, etc.).

In step 407, product recommendation system 330 may use the model and the extracted attributes from the queries, the filter applications, and the product specifications to determine a product category associated with the user identifier and the product identifier. In some embodiments, the training data may include at least one of historical queries, historical filter applications, or historical product specifications of a plurality of customers.

In some embodiments, product recommendation system 330 may generate a list of products based on the determined product category. For example, product recommendation system 330 may generate a list including all products with which user 320A (associated with the user identifier) engaged (e.g., products the user selected on a webpage, added to a cart on the webpage, or purchased on the webpage). In some embodiments, product recommendation system 330 may retrieve data from at least one of database 346 (the search action logs), query system 350, or customer affinity system 360 to generate the list. In some embodiments, the list of products may be generated based on user actions performed during the time span.

In some embodiments, product recommendation system 330 may calculate a similarity score for each product on the generated list. In some embodiments, product recommendation system 330 may calculate the similarity score based on a comparison of attributes of products on the generated list to the determined product category. In some embodiments, products with more attributes in common with attributes of the determined product category may have a higher similarity score. In some embodiments, product recommendation system 330 may remove products with similarity scores below a threshold from the generated list of products.

In step 409, product recommendation system 330 may generate a list of recommended products by calculating a similarity score for each product on the generated list of products. In some embodiments, product recommendation system 330 may calculate the similarity scores by assigning at least one weighted value to at least one factor. In some embodiments, the at least one factor may include historical user data of at least one of selecting a product on a webpage, adding a product to a cart on the webpage, or purchasing a product on the webpage.

For example, in some embodiments, attributes of products used to calculate similarity scores may include at least one of product price, product category, or aggregated customer actions. For example, product recommendation system 330 may calculate similarity scores based on a comparison of product prices on the generated list of products to the product price of the product identifier associated with the determined product category. In some embodiments, a threshold may include a price minimum, maximum, or range and product recommendation system 330 may remove products with similarity scores that do not meet the threshold from the generated list of products.

In some embodiments, product recommendation system 330 may determine search trends (e.g., user is searching for a discounted product, user is searching for specific brand of product, user is searching for a size range of a product, etc.) based on the extracted attributes and assign weighted values to factors in calculating the similarity score based on the search trends. For example, product recommendation system 330 may assign a higher weighted value to product price factors for products that have prices within a determined price range (e.g., the price range may be the average price within a predetermined deviation for products with which the user interacted).

In some embodiments, product recommendation system 330 may calculate similarity scores based on a comparison of product categories on the generated list to the determined product category. In some embodiments, product recommendation system 330 may remove products with similarity scores that indicate that the products do not belong to the determined product category from the generated list of products.

In some embodiments, product recommendation system 330 may calculate similarity scores based on a comparison of aggregated customer actions. For example, aggregated customer actions may include all customer actions (e.g., selecting a product on a webpage, adding a product to a cart on the webpage, purchasing a product on the webpage, etc.) for products belonging to the determined product category in the same time span or a different time span. In some embodiments, product recommendation system 330 may calculate similarity scores based on customer actions in a time span that ends at the point in time when the product belonging to the determined product category was purchased by a customer (e.g., user 320A).

In some embodiments, product recommendation system 330 may calculate similarity scores by assigning different weights to different customer actions. For example, purchasing a product on a webpage may be assigned a higher weight than adding a product to a cart on a webpage and adding a product to a cart on a webpage may be assigned a higher weight than selecting a product on a webpage. In some embodiments, products with similarity scores based on aggregated customer actions may not be initially included in the generated list of products. For example, product recommendation system 330 may calculate similarity scores based on a comparison of aggregated customer actions after generating the list of products. In some embodiments, product recommendation system 330 may add a predetermined number of products with the highest similarity scores to the generated list of products. In some embodiments, an internal user may determine the number of products to be added to the generated list. In some embodiments, the number of products to be added to the generated list may be determined based on historical data for all customers. For example, historical data may indicate that the predetermined number of products results in a list of products with the lowest amount of deviation in similarity scores.

In some embodiments, product recommendation system 330 may determine a plurality of product identifier based on the extracted keywords and determine that the plurality of product identifier belong to the same product category or related product categories. In some embodiments, product recommendation system 330 may determine a plurality of product categories for one or more product identifier. In some embodiments, product recommendation system 330 may perform steps, as described above, to generate a list of products for each determined product category.

In some embodiments, product recommendation system 330 may add greater weight to a product when the product appears on more than one generated list, resulting in a higher similarity score for that product. For example, if three lists are generated and product A appears on two lists while product B appears on three lists, product B is assigned a higher similarity score than product A, thereby advantageously resulting in a more accurate generated list for product recommendations.

For example, each product may have an initial numerical value for a similarity score based on different factors (e.g., user engagements such as selecting a product on a webpage, adding a product to a cart on a webpage, purchasing a product on a webpage, etc.). Product recommendation system 330 may assign a weighted value to a product by multiplying a weighted value by the initial similarity score of the product. For example, product A may be assigned a weighted value of "2" since it appears on two lists while product B may be assigned a weighted value of "3" since it appears on three lists.

In step 411, user 320A may interact with a user interface element associated with a webpage (e.g., SRP of FIG. 1B) to sort the generated list of recommended products. For example, product recommendation system 330 may modify a user interface element so that user 320A may sort the generated list of recommended products by price, similarity score, sales volume, etc. In some embodiments, product recommendation system 330 may automatically modify the user interface element to display the generated list of recommended products by price, similarity score, sales volume, etc.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for AI-based product recommendation generation, the system comprising:
   a memory storing instructions; and
   at least one processor configured to execute the instructions to:
      generate a model by training the model with training data, wherein the training data comprises at least one of historical queries, historical filter applications, or historical product specifications of a plurality of customers;
      receive, via a server, a query;
      extract at least one keyword from the query;
      based on the extracted at least one keyword, determine a user identifier and a product identifier;
      based on the determined user identifier and the determined product identifier, search a database associated with the user identifier and the product identifier;
      based on the user identifier and the product identifier, predict, using the generated model, a plurality of recommended products, by:
         determining a time span associated with the user identifier;
         retrieving at least one query submitted by a user associated with the user identifier during the time span associated with the user identifier;
         retrieving at least one filter application submitted by the user during the time span associated with the user identifier;
         retrieving at least one product specification associated with at least one product associated with the retrieved at least one query or the retrieved at least one filter application;
         extracting attributes from the retrieved at least one query, the retrieved at least one filter application, and the retrieved at least one product specification;
         determining a first product category and a second product category based on the extracted attributes;

determining a first frequency in engagement, via a user device, in the time span associated with the user identifier between the user and the first product category;

determining a second frequency in engagement, via the user device, in the time span associated with the user identifier between the user and the second product category;

determining that the first frequency is greater than the second frequency in the time span associated with the user identifier;

generating a list of products based on the determined first product category, wherein products belonging to the second category are excluded from the generated list of products;

generating a list of recommended products based on the generated list of products; and modifying a user interface element associated with a webpage, via the server, to include the generated list of recommended products.

2. The system of claim 1, wherein determining the time span associated with the user identifier comprises calculating a time in which the user performs a predetermined number of actions.

3. The system of claim 2, wherein the actions comprise at least one of selecting a product on the webpage, adding a product to a cart on the webpage, or purchasing a product on the webpage.

4. The system of claim 1, wherein the retrieved at least one query comprises at least one keyword associated with a product identifier.

5. The system of claim 1, wherein the retrieved at least one filter application comprises at least one of product dimensions, product brand, or product price.

6. The system of claim 1, wherein the retrieved at least one product specification comprises at least one of product dimensions, product brands, product colors, or product storage capacity.

7. The system of claim 1, wherein generating the list of recommended products comprises calculating a similarity score for each product on the generated list of products.

8. The system of claim 7, wherein calculating the similarity score comprises assigning at least one weighted value to at least one factor.

9. The system of claim 8, wherein the at least one factor comprises historical user data of at least one of selecting a product on the webpage, adding a product to a cart on the webpage, or purchasing a product on the webpage.

10. A method for AI-based product recommendation generation, comprising:

generating a model by training the model with training data, wherein the training data comprises at least one of historical queries, historical filter applications, or historical product specifications of a plurality of customers;

receiving, via a server, a query;

extracting at least one keyword from the query;

based on the extracted at least one keyword, determining a user identifier and a product identifier;

based on the determined user identifier and the determined product identifier, searching a database associated with the user identifier and the product identifier;

based on the user identifier and the product identifier, predicting, using the generated model, a plurality of recommended products, by:

determining a time span associated with the user identifier;

retrieving at least one query submitted by a user associated with the user identifier during the time span associated with the user identifier;

retrieving at least one filter application submitted by the user during the time span associated with the user identifier;

retrieving at least one product specification associated with at least one product associated with the retrieved at least one query or the retrieved at least one filter application;

extracting attributes from the retrieved at least one query, the retrieved at least one filter application, and the retrieved at least one product specification;

determining a first product category and a second product category based on the extracted attributes;

determining a first frequency in engagement, via a user device, in the time span associated with the user identifier between the user and the first product category;

determining a second frequency in engagement, via the user device, in the time span associated with the user identifier between the user and the second product category;

determining that the first frequency is greater than the second frequency in the time span associated with the user identifier;

generating a list of products based on the determined first product category, wherein products belonging to the second category are excluded from the generated list of products;

generating a list of recommended products based on the generated list of products; and modifying a user interface element associated with a webpage, via the server, to include the generated list of recommended products.

11. The method of claim 10, wherein determining the time span associated with the user identifier comprises calculating a time in which the user performs a predetermined number of actions.

12. The method of claim 11, wherein the actions comprise at least one of selecting a product on the webpage, adding a product to a cart on the webpage, or purchasing a product on the webpage.

13. The method of claim 10, wherein the retrieved at least one query comprises at least one keyword associated with a product identifier.

14. The method of claim 10, wherein the retrieved at least one filter application comprises at least one of product dimensions, product brand, or product price.

15. The method of claim 10, wherein the retrieved at least one product specification comprises at least one of product dimensions, product brands, product colors, or product storage capacity.

16. The method of claim 10, wherein generating the list of recommended products comprises calculating a similarity score for each product on the generated list of products.

17. The method of claim 16, wherein calculating the similarity score comprises assigning at least one weighted value to at least one factor.

18. The method of claim 17, wherein the at least one factor comprises historical user data of at least one of selecting a product on the webpage, adding a product to a cart on the webpage, or purchasing a product on the webpage.

19. A computer-implemented system for AI-based product recommendation generation, the system comprising:

a memory storing instructions; and at least one processor configured to execute the instructions to:
  generate a model by training the model with training data, wherein the training data comprises at least one of historical queries, historical filter applications, or historical product specifications of a plurality of customers;
  receive, via a server, a query;
  extract at least one keyword from the query;
  based on the extracted at least one keyword, determine a user identifier and a product identifier;
  based on the determined user identifier and the determined product identifier, search a database associated with the user identifier and the product identifier;
  based on the user identifier and the product identifier, predict, using the generated model, a plurality of recommended products, by:
    determining a time span associated with the user identifier;
    retrieving at least one query submitted by a user associated with the user identifier during the time span associated with the user identifier;
    retrieving at least one filter application submitted by the user during the time span associated with the user identifier;
    retrieving at least one product specification associated with at least one product associated with the retrieved at least one query or the retrieved at least one filter application;
    extracting attributes from the retrieved at least one query, the retrieved at least one filter application, and the retrieved at least one product specification;
    determining a first product category and a second product category based on the extracted attributes;
    determining a first frequency in engagement, via a user device, in the time span associated with the user identifier between the user and the first product category;
    determining a second frequency in engagement, via the user device, in the time span associated with the user identifier between the user and the second product category;
    determining that the first frequency is greater than the second frequency in the time span associated with the user identifier;
    generating a list of products based on the determined first product category, wherein products belonging to the second category are excluded from the generated list of products;
    generating a list of recommended products based on the generated list of products;
    calculating a similarity score for each product on the generated list;
    removing products with similarity scores below a threshold from the generated list; and
    modifying a user interface element associated with a webpage, via the server, to include the generated list of recommended products.

* * * * *